United States Patent
Koch et al.

(10) Patent No.: US 7,346,662 B2
(45) Date of Patent: Mar. 18, 2008

(54) METHODS, SYSTEMS, AND PRODUCTS FOR INDICATING RECEIPT OF ELECTRONIC MAIL

(75) Inventors: Robert A. Koch, Norcross, GA (US); Scott C. Holt, Decatur, GA (US)

(73) Assignee: AT&T Deleware Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 11/472,150

(22) Filed: Jun. 21, 2006

(65) Prior Publication Data

US 2006/0242250 A1    Oct. 26, 2006

Related U.S. Application Data

(63) Continuation of application No. 09/963,483, filed on Sep. 27, 2001, now Pat. No. 7,076,529.

(51) Int. Cl.
   *G06F 15/16*    (2006.01)
(52) U.S. Cl. .................. 709/206; 709/205; 709/207
(58) Field of Classification Search .............. 709/206, 709/207, 205
   See application file for complete search history.

(56) References Cited

U.S. PATENT DOCUMENTS

| | | | |
|---|---|---|---|
| 5,410,688 A * | 4/1995 | Williams et al. .............. 707/10 |
| 5,956,521 A | 9/1999 | Wang | |
| 6,108,701 A * | 8/2000 | Davies et al. ................ 709/224 |
| 6,141,686 A * | 10/2000 | Jackowski et al. .......... 709/224 |
| 6,144,938 A | 11/2000 | Surace et al. | |
| 6,154,465 A | 11/2000 | Pickett | |
| 6,212,265 B1 * | 4/2001 | Duphorne ............... 379/142.15 |
| 6,249,575 B1 | 6/2001 | Heilmann et al. | |
| 6,374,102 B1 | 4/2002 | Brachman et al. | |
| 6,406,868 B1 | 6/2002 | Kamboj et al. | |
| 6,487,584 B1 * | 11/2002 | Bunney ....................... 709/206 |
| 6,493,431 B1 | 12/2002 | Troen-Krasnow et al. | |
| 6,549,612 B2 | 4/2003 | Gifford et al. | |
| 6,630,883 B1 | 10/2003 | Amin et al. | |
| 6,816,878 B1 * | 11/2004 | Zimmers et al. ............. 709/200 |
| 6,850,757 B2 * | 2/2005 | Watanabe et al. ......... 455/412.2 |
| 6,871,214 B2 * | 3/2005 | Parsons et al. ............. 709/206 |
| 6,871,215 B2 * | 3/2005 | Smith et al. ................ 709/206 |
| 7,013,006 B1 | 3/2006 | Tischer | |
| 7,020,688 B2 * | 3/2006 | Sykes, Jr. .................... 709/206 |
| 7,231,420 B2 * | 6/2007 | Bach Corneliussen ...... 709/203 |
| 2003/0182383 A1 * | 9/2003 | He .............................. 709/206 |
| 2005/0107075 A1 | 5/2005 | Snyder | |

* cited by examiner

*Primary Examiner*—Michael Won
(74) *Attorney, Agent, or Firm*—Scott P. Zimmerman, PLLC; Geoff Sutcliffe; Jodi Hartman

(57) ABSTRACT

Methods, systems, and products are disclosed for delivering an indication of an email message's arrival. The email message is received and identifies at least an addressee. The addressee is looked up in a database that associates multiple addressees to a shared Internet Protocol address. The shared Internet Protocol address is retrieved and a message is sent to the shared Internet Protocol address. The message identifies the addressee of the email message and includes instructions for indicating arrival of the message at the addressee.

19 Claims, 5 Drawing Sheets

METHODS, SYSTEMS, AND PRODUCTS FOR INDICATING RECEIPT OF ELECTRONIC MAIL

CROSS-REFERENCE TO RELATED APPLICATIONS

This application is a continuation of U.S. application Ser. No. 09/963,483, filed Sep. 27, 2001, now issued as U.S. Pat. 7,076,529, and incorporated herein by reference in its entirety.

BACKGROUND

1. Field of the Invention

The present invention relates generally to data and telecommunications networks and more particularly to an advanced intelligent network service providing electronic mail notification.

2. Background of the Invention

Electronic mail (email) has become a very important means of communication in the homes of many people. Typically, email users in a home may share one or more computer systems which may or may not be connected a network in an "always on" fashion. In such multi-user environments, there is no convenient method for a typical user to be notified of the arrival of a new email message without the user first logging on to the computer system and then checking his or her inbox for new messages. Even when the computer is connected to an "always on" communications network, there is no convenient means for individually alerting a user when a message has been received for that particular user.

Because of the lack of a convenient email notification system, the burden is on the user to actively check for the arrival of email—requiring the user to boot up the computer and activate a network communications session. One problem with the conventional model for checking email arises when a user is expecting an email message from a specific sender, but has only a limited amount of time for accessing the computer or network needed for logging on to determine whether or not the message has arrived. In this case, the user must constantly check his or her inbox to see if the message has arrived, and each time, there is no way of knowing whether or not that message or any messages have been received. Even when the user is fortunate enough to have a shared always-on environment (e.g., an always on broadband internet appliance shared by members of a family), there is still no convenient, shared interface by which to notify all members of email arrival. A need therefor exists for systems and methods for notifying a user that an email message has arrived without requiring access to the computer or the communications network.

SUMMARY OF THE INVENTION

The present invention comprises systems and methods for delivering a notification of an email arrival to one or more customer premises equipment to alert users that an email has been received at a mail server. The systems and methods comprise receiving a message on an application server where the message includes at least an email addressee. The application server uses the email addressee to lookup a subscriber's directory number or an internet protocol address and user name associated with the email addressee. Based at least in part on this information, the application server sends an instruction a service control point (if the lookup returns a directory number) or to the internet protocol address (if the lookup returns such an address). If the instruction is sent to a service control point, then the service control point causes an advanced intelligent node to initiate a call to the subscriber directory number and send a signal to the telephone customer premises equipment. If the instruction is sent to the internet protocol address, then a network node associated with the internet protocol address displays a notification alerting the user that email has arrived on a mail server.

DETAILED DESCRIPTION OF THE INVENTION

The present invention provides systems and methods for individually alerting users in a shared environment when an email message has been received on a mail host for retrieval by a particular user. In an embodiment of the present invention, the notification may be provided using the advanced intelligent network (AIN) of the public switched telephone network (PSTN). Users may be notified of email arrival via either a telephone alert or a caller identification (caller-id) display device. In another embodiment of the present invention, the notification may be provided by a message sent to an always-on broadband appliance in the users' home. In this embodiment, the broadband appliance is be directed to display an indicator identifying the recipient's name. Further information can also be indicated, e.g., the priority of the message, the date/time stamp for the message, and so on.

Figure 1:
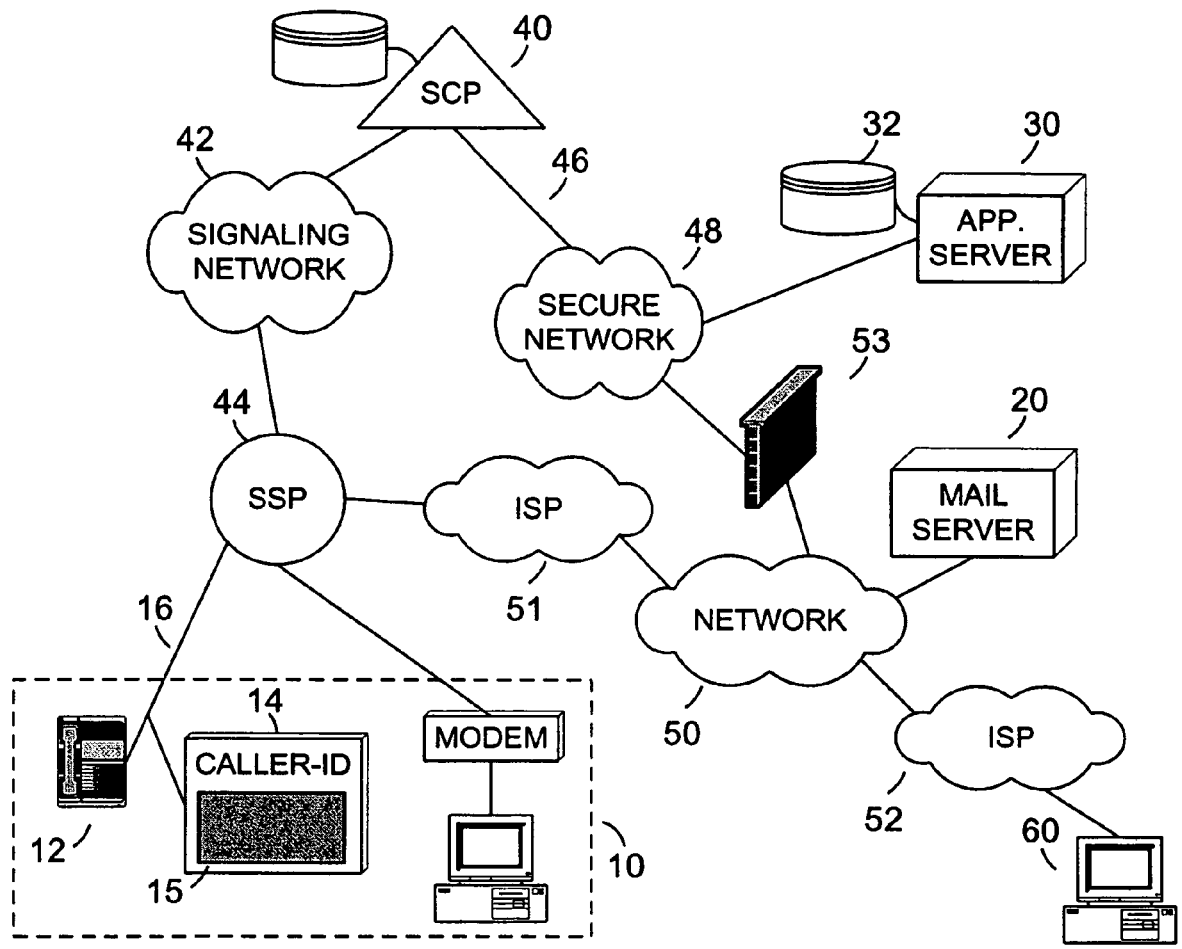
FIG. 1 shows a schematic diagram of an embodiment of the present invention wherein a user is alerted via a telephone ringing pattern or a caller identification display device attached to the user's telephone line (subscriber line).

FIG. 1 illustrates an embodiment of the present invention wherein the user is alerted via the PSTN. In this embodiment, when an email arrives at subscriber 10's mail server 20, the message is automatically forwarded to application server 30 to initiate telephonic notification to subscriber 10. Application server 30 sends a message to service control point (SCP) 40, which is an AIN node. SCP 40 instructs the subscriber's service switching point (SSP) 44 to deliver the email notification to subscriber 10's telephone 12 and/or caller-id device 14.

The following sections describe the configuration and operation of an exemplary embodiment of the present invention.

Mail and Application Server Configuration

Mail server 20 may be any computer system adapted to send and receive email via network 50. Network 50 may be the well-known Internet, as shown in FIG. 1, or may be some other communications network. Network 50 can be coupled to one or more Internet Service Providers (ISP) such as ISP 51 and ISP 52. If mail server 20 is a "standalone" server, i.e., not capable of direct communication with SCP 40, the subscriber or an email administrator may setup mail server 20 to forward inbound messages to application server 30. If mail server 20 and application server 30 are the same system, there is no need to forward the inbound messages as they would be received on the same server system. Further, subscriber 10 may configure mail server 20 with one or more filters to identify specific email messages for which notification according to the present invention is to be presented. For example, subscriber 10 may wish only email from a particular individual to initiate the special notification process. Alternatively, subscriber 10 may setup mail server 20 to provide alerts only for email messages having a high priority designation, e.g., messages marked "urgent."

Application server 30 comprises computer programming logic and data used to correlate the subscriber's email address to the subscriber's telephone number. In one embodiment, application server 30 has a list or database of subscriber email addresses and associated directory numbers (DN) identifying the telephone line to be used to notify the subscriber. As described above, because telephone lines within a household are typically shared systems, the present invention may include the capability to provide distinct notification for different email addresses associated with a single DN. For example, subscriber 10's household can comprise three individuals, each having his or her own email address: "jane.doe@address1.com" (used by Jane) "robert.doe@address2.com" (used by Bob) and "video-wiz@address3.com" (used by Jr.) where address1-address3 may or may not be the same domain names. Subscriber 10's wireline DN can be, for example, "111-222-3333." In this case, application server 30 may comprise a table or other data structure associating the email addresses with the DN. An example of such a data structure is shown in Table 1, below:

TABLE 1

| Email Address | DN |
| --- | --- |
| jane.doe@address1.com | 111-222-3333 |
| robert.doe@address2.com | 111-222-3333 |
| video-wiz@address3.com | 111-222-3333 |
| aaa.bbb@address4.net | 444-555-6666 |
| ... | ... |

In alternative embodiments, application server 30 may include additional information. For example, server 30 may associate the email addresses with their respective user names and the DN as shown in Table 2, below. The user name information may used as part of the caller-id display text to specifically identify the email recipient in subscriber 10's household.

TABLE 2

| Email Address | DN | User Name |
| --- | --- | --- |
| jane.doe@address1.com | 111-222-3333 | Jane |
| robert.doe@address2.com | 111-222-3333 | Bob |
| video-wiz@address3.com | 111-222-3333 | Jr. |
| aaa.bbb@address4.net | 444-555-6666 | James |
| ... | ... | ... |

In another alternative embodiment, application server 30 may include distinctive ring tones selected by each user in subscriber 10's household as shown in Table 3. The ring tone (A, B, C, etc.) indicates the style of audible alarm that telephone 12 will issue, e.g., a short ring plus a long ring, three short rings, and so on. This embodiment may be useful for subscribers that do not have a caller-id display device. In this case, household members hearing the distinctive ring of telephone 12 will be able to identify the intended recipient of the notification.

TABLE 3

| Email Address | DN | Ring Tone |
| --- | --- | --- |
| jane.doe@address1.com | 111-222-3333 | A |
| robert.doe@address2.com | 111-222-3333 | B |
| video-wiz@address3.com | 111-222-3333 | C |
| aaa.bbb@address4.net | 444-555-6666 | B |
| ... | ... | ... |

In still another alternative embodiment, application server 30 may include both the user name information and the distinctive ring identification associated with each email address as shown in Table 4. This embodiment may be used to provide both audible and text-based email notification to subscriber 10's household.

TABLE 4

| Email Address | DN | User Name | Ring Tone |
| --- | --- | --- | --- |
| jane.doe@address1.com | 111-222-3333 | Jane | A |
| robert.doe@address2.com | 111-222-3333 | Bob | B |
| video-wiz@address3.com | 111-222-3333 | Jr. | C |
| aaa.bbb@address4.net | 444-555-6666 | James | B |
| ... | ... | ... | ... |

In each case, the email address is used by application server 30 to lookup the recipient's DN and the other information, if provided. The DN and auxiliary information is then provided to and used by SCP 40 as described in the next section.

Figure 2:
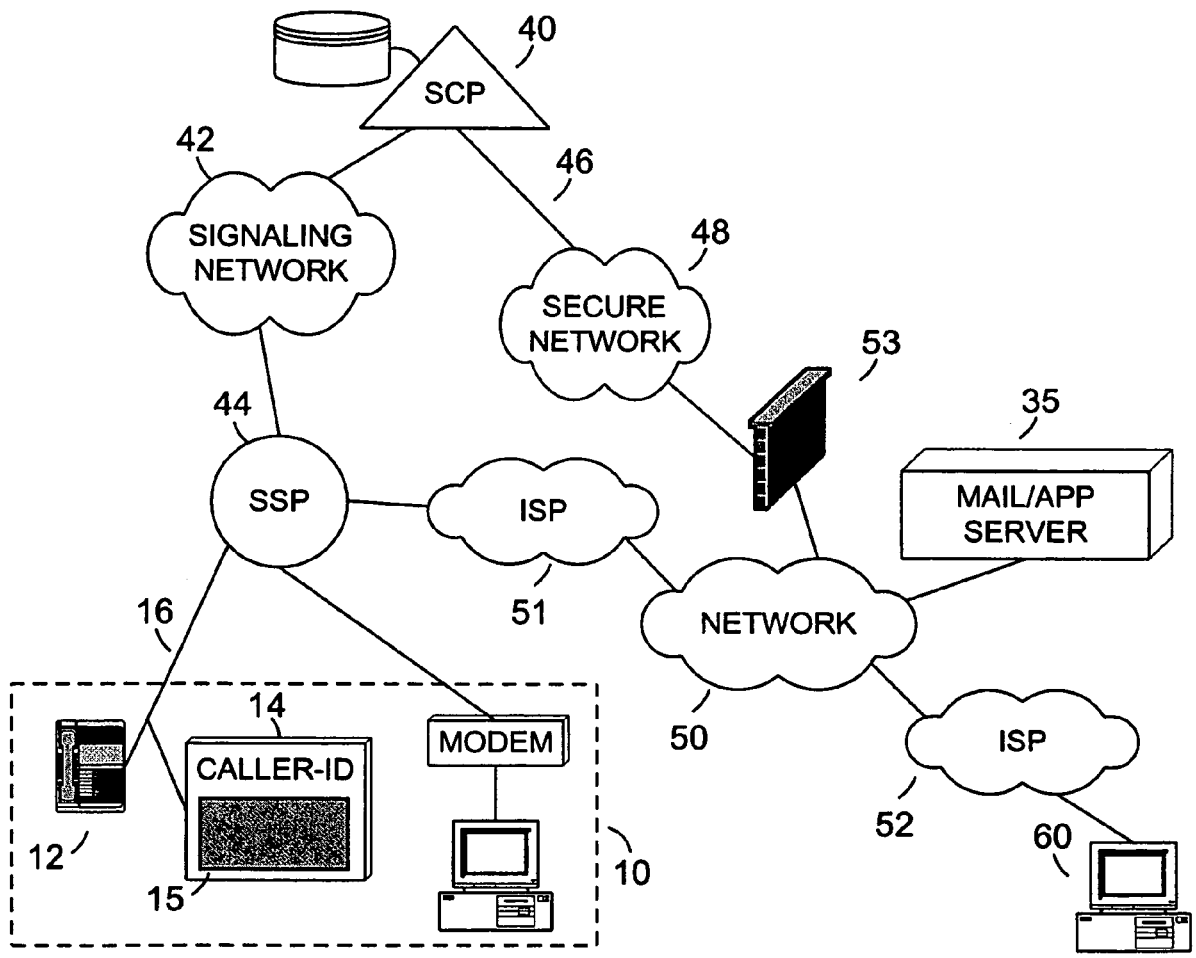
FIG. 2 shows a schematic diagram of an alternative embodiment of the present invention wherein the user is alerted via a telephone ringing pattern or a caller identification display device attached to the user's telephone line (subscriber line).

In an alternative embodiment, application server 30 and mail server 20 may be the same system. That is, if mail server 20 is a system having authorization to communicate directly with the AIN nodes, such as a system operated by a telephone company (telco), it may perform any of the functions described herein in connection with application server 30. FIG. 2 is a schematic diagram showing how this embodiment can be implemented. In FIG. 2, mail and application server 35 serves the function of receiving email addressed to subscriber 10 as well as the function of sending a message to SCP 40.

SCP Configuration and Operation

SCP 40 may be configured to receive information from application server 30 via a data communications network using any suitable network protocol. In one embodiment, the network uses the well-known transmission control protocol/internet protocol (TCP/IP) protocol. SCP 40 comprises an email notification application for receiving messages from application server 30. Upon receipt of a message, SCP 40 uses signaling network 42 to instruct the subscriber's service switching point (SSP) 44 to provide the notification to the subscriber's telephone or caller-id display device. Signaling network 42 may comprise the well-known Common Channel Signaling System Number 7 (SS7) as shown in FIG. 1, or alternatively, some other signaling network protocol.

SCP 40 is also equipped with a data communications channel connected to network link 46. Network link 46 may use the well-known TCP/IP network protocol or some other communications protocol. Application server 30 (or combined mail and application server 35 in FIG. 2) communicate with SCP 40 via network link 46. Secure network 48 is shown to illustrate that in a typical environment, AIN elements (SCPs, SSP, etc.) are protected by security devices such as, e.g., firewall 53. as would be apparent to those skilled in the art, the security devices are not necessary for the operation of the present invention.

Exemplary Embodiments of the Present Invention

In this example, application server 30 includes subscriber data as shown in Table 4, above. That is, the application server comprises DN, username and distinctive ringing data. This example will show how the system operates to notify different users within subscriber 10's household. The members in that household comprise Robert Doe, Sr., Jane Doe, and Robert Doe, Jr and the DN for subscriber 10's home wireline 16 is 111-222-3333. Each member of subscriber 10's household has their own email address as shown in Table 4, and they receive email service from one or more mail servers, such as mail server 20, configured to forward arriving email messages for these users to application server 30.

When user 60 sends an email addressed to an email address for one of the members of subscriber 10's household (for example, robert.doe@address2.com), the email is routed over network 50 to the member's mail server. The mail server then forwards the email to application server 30. In embodiments of the present invention, the mail server may send a new email or other type of message to application server 30. In such embodiments, the new message comprises at least the addressee information from user 60's email. The new message may also comprise additional information, including, for example, the sender's name, the message subject, the date and time, etc.

When application server 30 receives the forwarded email message (or the new message) from mail server 20, it looks up the addressee's email address in its database 32 to determine the subscriber's DN and other information, if provided. In this example, application server 30 identifies the DN as "111-222-333" by looking up the email address "robert.doe@address2.com" in database 32. Further, in this example, the lookup also returns the username "Bob" and the distinctive ring code "B" associated with this email address. Application server 30 then sends the information to SCP 40 (via network link 46). A service programming application (SPA) on SCP 40 receives the message and causes SCP 40 to issue a signaling command to initiate a call to subscriber 10's wireline 16.

In one embodiment, the SCP issues a Create_Call instruction according to the well-known transaction capabilities application part (TCAP) protocol of SS7 signaling networks. The Create_Call message may include a called party number (CdPN) field set to the DN associated with the subscriber (in this example, the CdPN would be set to 1112223333).

Further, the Create_Call message may a calling party number (CgPN) set to an arbitrary set of digits to indicate the call is from the email message notification system. For example, the CgPN field may be set to all zeroes ("0000000000") or another string of digits. If, as in this example, the subscriber has caller-id device 14, the Create_Call message may include a Display Text field providing additional information. For example, the Display Text field may be set to "Email for <username>" where username is information provided by application server 30. In this example, the Display Text field data may be set to "Email for Bob." As known in the art, the display text data may be provided by the SCP after a subsequent CNAM query by SSP 44. Finally, the Create_Call message may include a Controlling Leg Treatment field set to a code indicating the distinctive ring pattern for the call. In this example, the field would be set such that ring pattern "B" (associated with Bob) would be used. Even in embodiments where the individual users of a household may not select individual distinctive ring patterns, the system and method of the present invention may, optionally, provide a distinctive ring to differentiate between regular telephone calls and email notification calls.

Figure 1A:
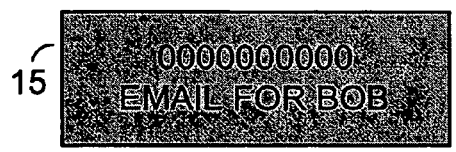
FIGS. 1A-1D show alternative display messages which may be used in different embodiments of the present invention.

When SSP 44 receives the instruction from SCP 40, it attempts a call to subscriber 10's wireline 16. SSP 44 uses the information provided in the Create_Call message to determine which line to call and to identify the proper ringing pattern and display information. In this example, telephone 12 would ring for a predetermined number of rings using ring pattern "B" and display area 15 on caller-id device 14 would display a message as shown in FIG. 1A.

Figure 1B:
Figure 1C:
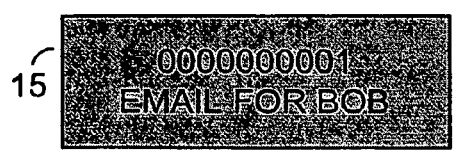
Figure 1D:
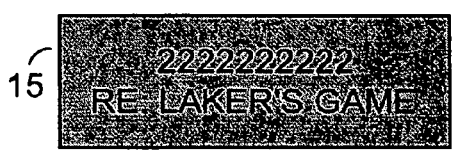

The caller-id display device can be used to provide notification of email in a variety of alternative formats according to the present invention. For example, application server 30 may be configured to provide a code indicating the username instead of the text-based name used in the previous example. In this case, the code may identify each member of the household (e.g., the code "1111111111" may indicate Jane, "2222222222" may indicate Bob, and so on). In this embodiment, SCP 40 may use this code in the CgPN field, and may include some other message in the Display text field such as the sender's email address. For example, display area 15 may present a message as shown in FIG. 1B. In another embodiment, the subscribers may configure application server 30 with additional information, such as a code to identify the sender of an email. For example, the sender's email address may be "user@mailaddr" and the assigned code may be "1." In this case, application server 30 would inform SCP 40 that the sender's code is "1" and SCP 40 would insert the digits "0000000001" into the CgPN field. The resulting displayed message may be as shown in FIG. 1C. FIG. 1D shows another example of the message displayed on caller-id device 14. In this example, the CgPN is used to indicate the recipient and the Display Text is used to indicate the subject of the email message.

Figure 3:
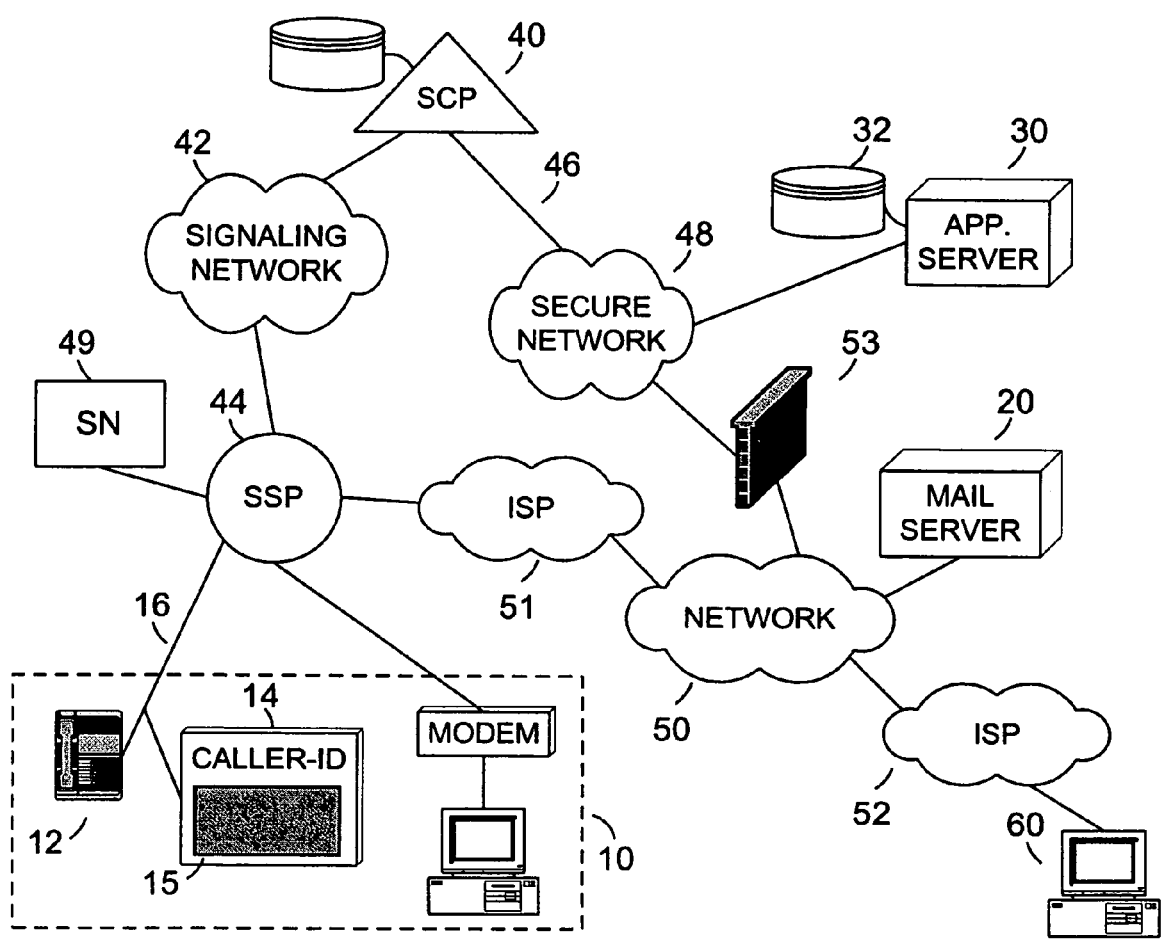
FIG. 3 shows a schematic diagram of an alternative embodiment of the present invention wherein the user is alerted via a telephone ringing pattern or a caller identification display device attached to the user's telephone line (subscriber line), or via a text-to-voice announcement.

In another embodiment of the present invention, a service node (SN) may used to complete the call to the subscriber. For example, as shown in FIG. 3, SN 49 may be used to initiate the call to subscriber 10's wireline 16. In this embodiment, SCP 40 sends a message to SN 49 providing the subscriber's DN and SN 49 initiates the call as it would any other call. Although shown connected to SSP 44 in FIG. 3, SN 49 need not be connected to the same SSP as the subscriber. In this embodiment, when SN 49 calls wireline 16, the CgPN is that of SN 49. When the call reaches subscriber 10's SSP (SSP 44), a termination attempt trigger (TAT) on wireline 16 signals SSP 44 to issue a TCAP query to SCP 40. In response to the query, SCP 40 recognizes the CgPN as the DN for SN 49. SCP 40 uses this information, together with the CdPN (i.e., subscriber 10's DN) to lookup the information last provided to it by application server 30. This information is then provided in a TCAP response to SSP 44 which then provides the information in the appropriate format to the subscriber 10, as described above.

In another embodiment of the present invention, SN 49 may be equipped with a text-to-spoken language system. In this embodiment, SCP 40 can provide all of the information related to the email message directly to SN 49. SN 49 can then call subscriber 10 and play an announcement such as "Bob has received an email from user@emailaddr."

Embodiments Related to Broadband Shared Appliances

Figure 4:
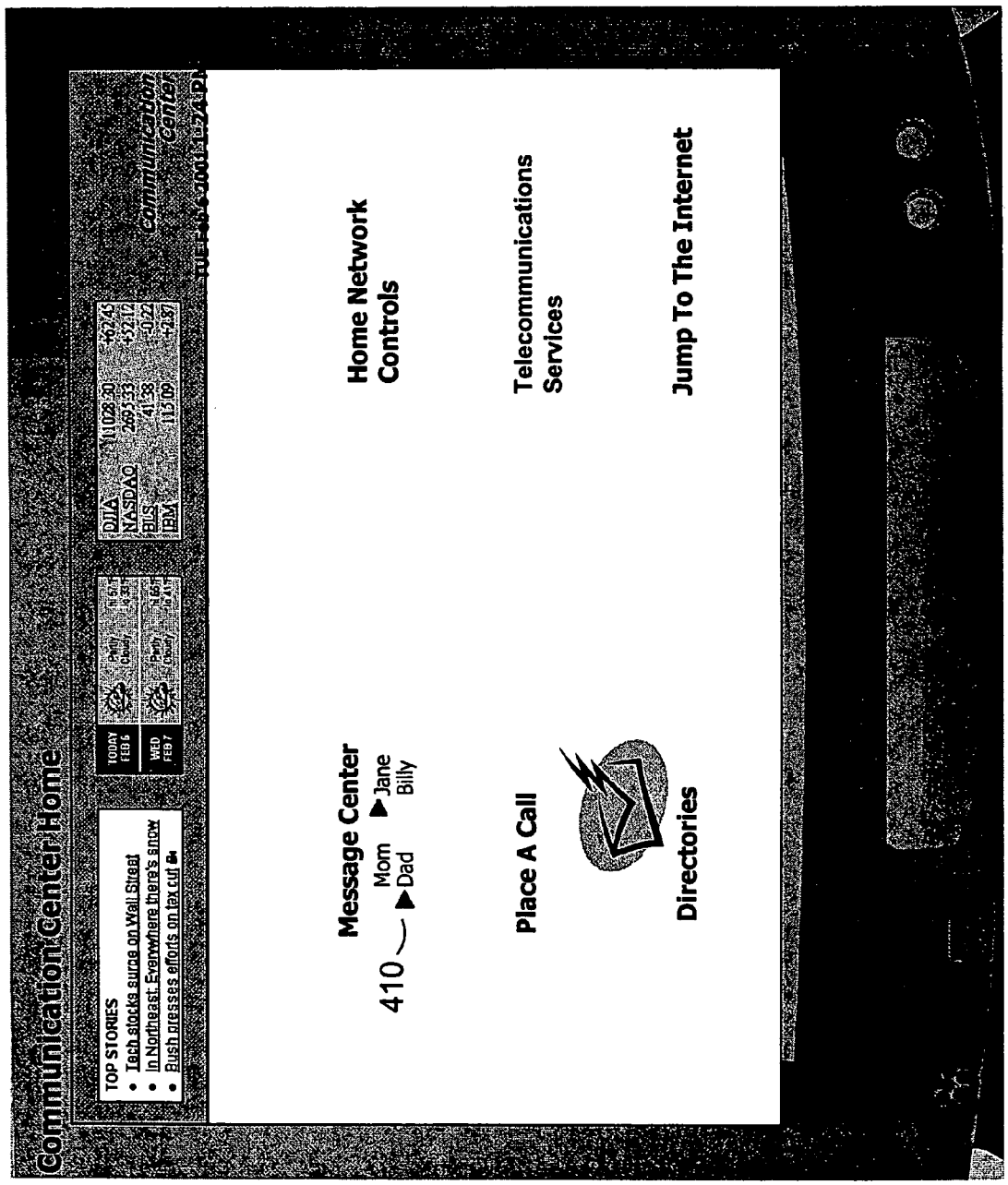
FIG. 4 is a schematic diagram illustrating a typical broadband appliance displaying an email notification according to the present invention.
Figure 5:
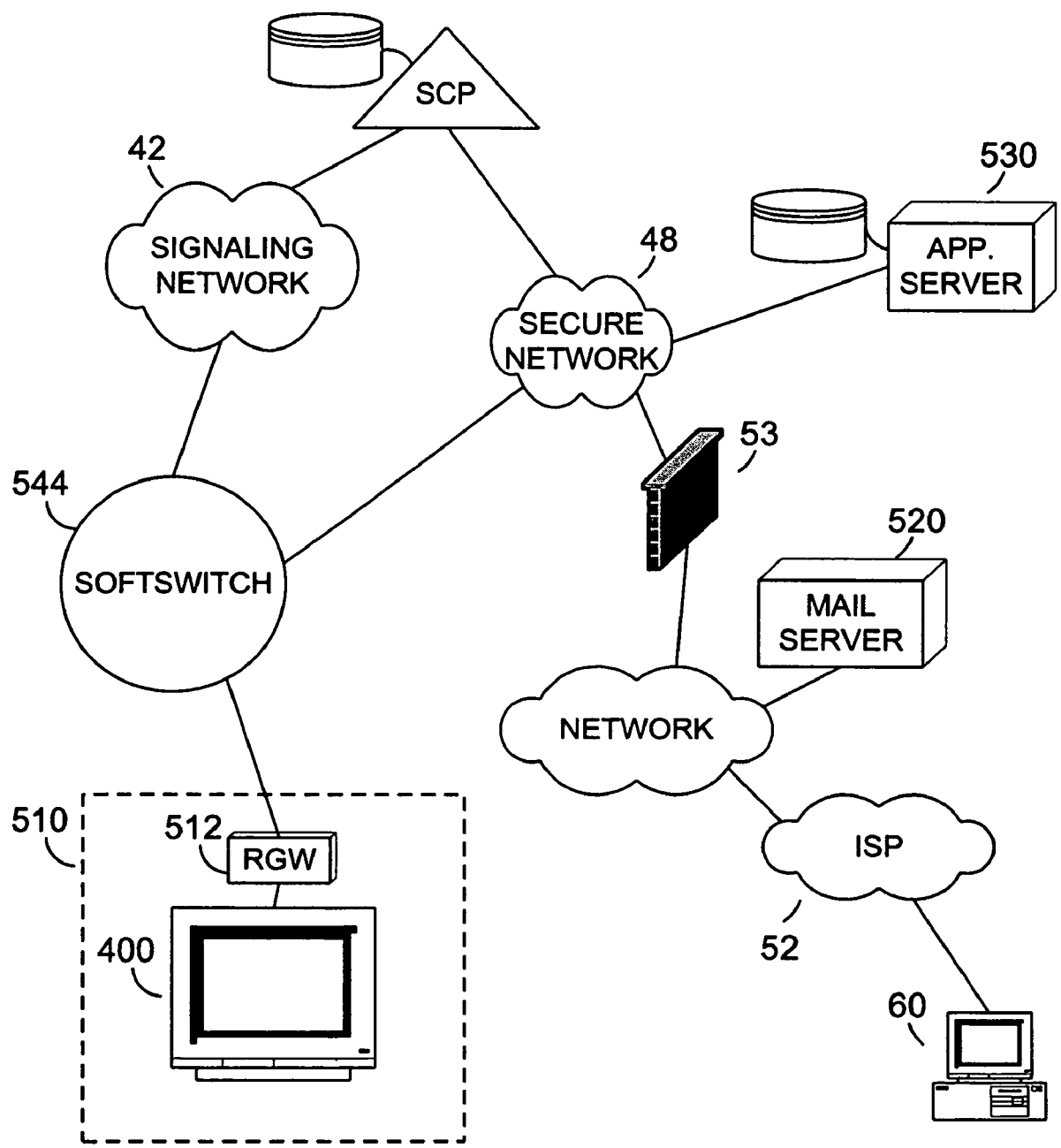
FIG. 5 shows a schematic diagram of an alternative embodiment of the present invention wherein the user is alerted via a broadband appliance.

FIG. 4 illustrates a shared broadband appliance which may be used in a subscriber's home. Such a device may be used to provide a variety of services including, but not limited to, email messaging, voice calls, web-casting (i.e., broadcasts provided via the Internet), web browsing, and so on. FIG. 5 shows a network architecture in which such a broadband appliance may be supported. Broadband appliance 400 is linked to softswitch 544. This connectivity may or may not be made via a residential gateway (RGW), such as RGW 512 shown in FIG. 5. Whether or not such a gateway is present is dependent upon the specific broadband implementation in subscriber 510's household.

In this embodiment, mail server 520 and application server 530 may be configured in the same manner as described above in conjunction with FIGS. 1-3. An exception in this embodiment, is that application server 530 need not include subscriber 510's DN. Instead, application server 530 is configured with an IP address associated with broadband appliance 400 (or with RGW 512, if present). Using this information, Application server 530 sends a message to broadband appliance 400 via softswitch 544. The message instructs broadband appliance 400 to display an icon or other visual indicator that an email has been received at mail server 520 for a particular user. Indicator 410, shown in FIG. 4, is an example of such an icon and indicates that "Dad" has new email. In preferred embodiments, a user may click on the icon or in some other area of the display on broadband appliance 400 to retrieve additional information such as, for example, the sender's email address, the date and time of the message, and the like.

The email notification system and method of the present invention can be used to provide notification to a user via distinctive ringing patterns, caller-id, a shared broadband internet appliance, a combination of these devices, and so on.

User Interface

The email notification systems and methods of the present invention may be advantageously administered by subscribers using a web-based interface running on the application server. This interface provides a means by which users can subscribe to the service via the web. The web interface also allows users to specify where and how they want to be notified of email arrival, which may or may not be filtered.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art can appreciate, other sequences of steps may be possible. Therefore, the particular order of the steps set forth in the specification should not be construed as limitations on the claims. In addition, the claims directed to the methods and/or processes of the present invention are not limited to the performance of their steps in the order written, and one skilled in the art can readily appreciate that the sequences may be varied and still remain within the spirit and scope of the present invention.

What is claimed is:

1. A method for delivering an indication of an email message's arrival, said method comprising:
   receiving the email message identifying at least an addressee;
   looking up the addressee in a database, the database associating multiple addressees to a shared Internet Protocol address;
   retrieving the shared Internet Protocol address;
   sending a message to the shared Internet Protocol address, the message identifying the addressee of the email message, and the message including instructions for particularly indicating the arrival of the message to the addressee from amongst the multiple addressees sharing the Internet Protocol address;
   sending an email address of a sender of the email message;
   retrieving a distinctive ring tone associated with the addressee from multiple ring tones associated with the shared Internet Protocol address, the distinctive ring tone selected by the addressee to provide a distinctive notification despite different addressees associated with the shared Internet Protocol address; and
   sending a signal to a directory number associated with the addressee to provide the distinctive notification of the email message's arrival.

2. A method according to claim 1, further comprising retrieving a user name associated with the addressee.

3. A method according to claim 1, further comprising sending a priority associated with the email message.

4. A method according to claim 1, further comprising sending a date of receipt of the email message.

5. A method according to claim 1, further comprising sending a time of receipt of the email message.

6. A method according to claim 1, further comprising sending an email address of a sender of the email message.

7. A method according to claim 1, further comprising configuring a filter that identifies email messages for which arrival is to be indicated.

8. A method for delivering an indication of an email message's arrival, said method comprising:
   receiving a message addressed to a shared Internet Protocol address that is shared amongst multiple addressees, the message identifying an addressee of the email message and including instructions for indicating arrival of the email message to the addressee;

causing a notification that indicates the email message was received for the addressee;

retrieving a distinctive ring tone associated with the addressee from multiple ring tones associated with the shared Internet Protocol address, the distinctive ring tone selected by the addressee to provide a distinctive notification despite different addressees associated with the shared Internet Protocol address; and sending a signal to a directory number associated with the addressee to provide the distinctive notification of the email message's arrival.

9. A method according to claim 8, further comprising receiving a user name associated with the addressee.

10. A method according to claim 9, further comprising causing display of an icon associated with the user name.

11. A method according to claim 8, further comprising receiving a priority associated with the email message.

12. A method according to claim 8, further comprising receiving a date of receipt of the email message.

13. A method according to claim 8, further comprising receiving a time of receipt of the email message.

14. A method according to claim 8, further comprising receiving an email address of a sender of the email message.

15. A system for delivering an indication of an email message's arrival, said system comprising:

means for receiving the email message identifying at least an addressee, means for looking up the addressee and associating multiple addressees to a shared Internet Protocol address, means for retrieving the shared Internet Protocol address, means for sending a message to the shared Internet Protocol address, the message identifying the addressee of the email message and including instructions for particularly indicating arrival of the message to the addressee from amongst the multiple addressees sharing the Internet Protocol address, means for sending an email address of a sender of the email message, means for retrieving a distinctive ring tone associated with the addressee from multiple ring tones associated with the shared Internet Protocol address, the distinctive ring tone selected by the addressee to provide a distinctive notification despite different addressees associated with the shared Internet Protocol address, and means for sending a signal to a directory number associated with the addressee to provide the distinctive notification of the email message's arrival.

16. A system according to claim 15, further comprising means for retrieving a user name associated with the addressee.

17. A system according to claim 15, further comprising means for sending a priority associated with the email message.

18. A system according to claim 15, further comprising means for sending a date of receipt of the email message.

19. A system according to claim 15, further comprising means for sending a time of receipt of the email message.

* * * * *